United States Patent
Myers et al.

(10) Patent No.: US 7,417,853 B1
(45) Date of Patent: Aug. 26, 2008

(54) COOLING STAND FOR A LAPTOP COMPUTER

(76) Inventors: Homer E. Myers, 1601 SE. 140th CT, Vancouver, WA (US) 98683-7025; Kenneth W. Johnson, 171 N. Church La., Unit #509, LA, CA (US) 90049

( * ) Notice: Subject to any disclaimer, the term of this patent is extended or adjusted under 35 U.S.C. 154(b) by 0 days.

(21) Appl. No.: 11/810,105

(22) Filed: Jun. 4, 2007

(51) Int. Cl.
  *G06F 1/16* (2006.01)
(52) U.S. Cl. .................. 361/683; 361/687; 248/917; 248/918
(58) Field of Classification Search ......... 361/679–683, 361/686–690, 724–727; 312/223.1, 223.2; 248/688, 917, 918; D14/447, 451
See application file for complete search history.

(56) References Cited

U.S. PATENT DOCUMENTS

| | | | |
|---|---|---|---|
| D173,318 S * | 10/1954 | Levenhagen | D7/554.3 |
| 4,830,328 A * | 5/1989 | Takach et al. | 361/685 |
| 5,503,361 A * | 4/1996 | Kan-O et al. | 248/688 |
| 6,115,249 A | 9/2000 | Cipolla | |
| 6,256,193 B1 * | 7/2001 | Janik et al. | 361/683 |
| 6,352,233 B1 * | 3/2002 | Barberich | 248/676 |
| D470,149 S * | 2/2003 | West | D14/447 |
| 6,545,864 B2 | 4/2003 | Davis | |
| 6,682,040 B1 | 1/2004 | MacEachern | |
| D494,977 S * | 8/2004 | Persson | D14/447 |
| 6,819,548 B2 * | 11/2004 | Hillis et al. | 361/681 |
| 6,871,739 B2 * | 3/2005 | Lopez | 206/320 |
| 7,012,806 B2 * | 3/2006 | Jones et al. | 361/686 |
| 7,161,799 B2 | 1/2007 | Lim | |
| 7,206,198 B2 * | 4/2007 | Wang | 361/683 |
| 7,207,540 B2 * | 4/2007 | Thomas | 248/346.01 |
| 2002/0100398 A1 * | 8/2002 | Santini | 108/157.1 |
| 2006/0104022 A1 * | 5/2006 | Wilcox | 361/687 |
| 2006/0285283 A1 * | 12/2006 | Simonian et al. | 361/679 |
| 2006/0291161 A1 * | 12/2006 | Tran et al. | 361/688 |

* cited by examiner

*Primary Examiner*—Jayprakash N Gandhi
*Assistant Examiner*—Anthony Q Edwards

(57) ABSTRACT

A stand supports a laptop computer spaced above a supporting surface so that air can circulate between the computer and the supporting surface to cool the computer.

2 Claims, 1 Drawing Sheet

COOLING STAND FOR A LAPTOP COMPUTER

TECHNICAL FIELD OF THE INVENTION

The present invention relates to the general art of supports, and to the particular field of stands for computers.

BACKGROUND OF THE INVENTION

The proliferation of portable personal computers, or laptop computers, is well documented. Laptop computers are used by business travelers to perform virtually all of the tasks enabled by desk top computers during previously unproductive hours traveling on airplanes, in hotels, and generally away from the office. Laptops also offer an alternative to bulkier, space consuming desk top models, with the opportunity to readily take the laptop to remote locations such as lectures, business meetings, or the like, and also to bring one's computer home in the evenings to continue working on projects. The reduction in the size and weight of today's laptops render them indispensable to travelers and business people around the world.

Laptop computers, like desk top computers, include a processing unit or chip that performs calculations used in the operation of the laptop. The processing unit generates a substantial amount of heat, and as processors grow more powerful and faster (in the multi-Gigahertz range) the amount of heat that the chips generate continues to increase. In most desktop computers, there are fans, heat sinks and adequate airspace to dissipate the heat generated by the processor. However, in a laptop computer there is very little room for large fans or open airspace, so heat is transferred through the underside of the computer where it comes in contact with the user's lap. The processors can produce up to 100 watts per square centimeter—the equivalent heat generated by a light bulb, and temperatures can easily reach 115° F. or more. The push for smaller and lighter laptop computers exacerbates the problem of heat dissipation. The heat problem is a byproduct of consumer demand for smaller, faster computers with reasonable battery life because large fans and extra airspace require larger units with reduced battery life. As a result, the underside of a laptop computer is notorious for being very warm or even hot to the touch when it has been running for a period of time.

Left unchecked, the heat build up of the laptop computer is transferred to the user at the point of contact where the laptop rests on the user's lap. As the laptop heats up, the build up of heat may become uncomfortable and can even result in pain. In this event, the user must endure the discomfort or discontinue operation of the laptop to allow the unit to cool down. Once cooled down, the laptop will once again begin to heat up to the point where discomfort requires another shutdown to allow further cooling. This discomfort can be eliminated by using the laptop tray, or by using it in its carrying case. However, using a laptop on any flat surface, tray, table, or in its carrying case restricts cooling. This can cause the laptop to overheat and fail.

SUMMARY OF THE INVENTION

The above-discussed disadvantages of the prior art are overcome by a stand that supports a laptop computer spaced above a supporting surface and includes indentations between surfaces that will contact the laptop computer and the remainder of the supporting element so that air can circulate between the computer and the supporting surface and between the computer and the stand to cool the computer. The stand includes a plurality of elements that are hingeably connected together so the stand can be collapsed for storage. In all cases the laptop cooling stand elevates the laptop to let hot air flow away from it.

Other systems, methods, features, and advantages of the invention will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWING FIGURES

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE INVENTION

Figure 1:
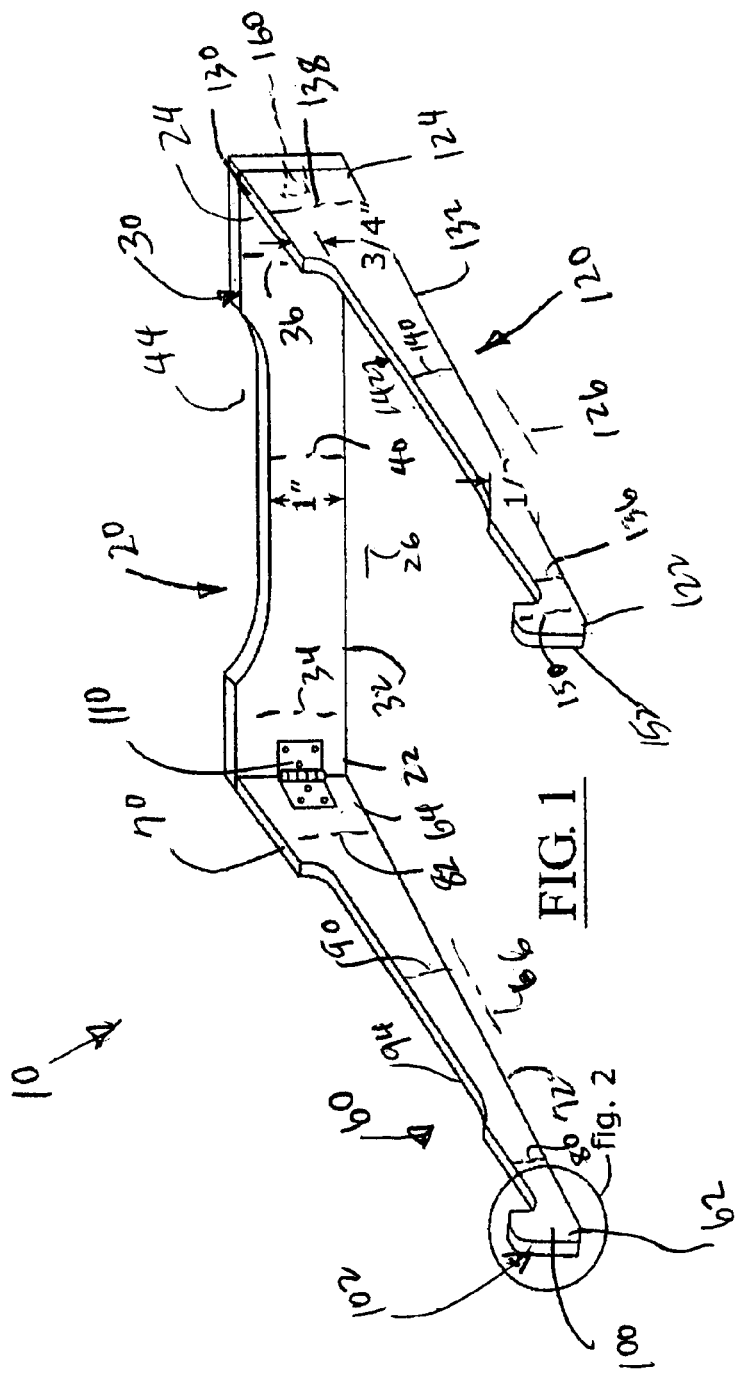
FIG. 1 is a perspective view of a laptop computer support stand embodying the present invention.
Figure 2:
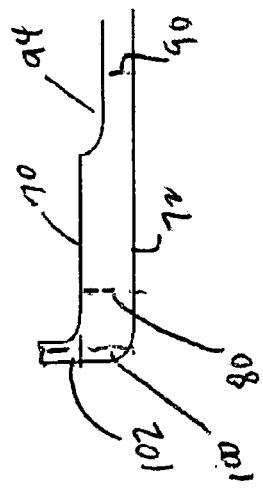
FIG. 2 shows a detail of FIG. 1.

Referring to the figures, it can be understood that the present invention is embodied in a laptop computer support stand 10. Stand 10 comprises a first leg 20 which includes a first end 22, a second end 24 and a longitudinal axis 26 which extends between first end 22 and second end 24 of first leg 20. First leg 20 further includes a first side edge 30 which is a top side edge when the first leg is in use and a planar second side edge 32 which is a bottom side edge when the first leg is in use. A first transverse axis 34 is located adjacent to first end 22 of the first leg and extends between first side edge 30 and second side edge 32 of the first leg. A second transverse axis 36 is located adjacent to second end 24 of the first leg and extends between first side edge 30 and second side edge 32 of the first leg. Second transverse axis 36 is essentially equal in length to first transverse axis 34 of the first leg. A third transverse axis 40 is located between first end 22 and second end 24 of the first leg and extends between first side edge 30 and second side edge 32 of the first leg. Third transverse axis 40 is smaller in length than first transverse axis 34 of the first leg. An indentation 44 is defined in first side edge 30 of the first leg. Indentation 44 is located between the first end of the first leg and the second end of the first leg.

A second leg 60 includes a first end 62, a second end 64 and a longitudinal axis 66 which extends between first end 62 and second end 64 of the second leg. Second leg 60 further includes a first side edge 70 which is a top side edge when the second leg is in use. First side edge 70 of second leg 60 adjacent to second end 64 of the second leg is co-planar with first side edge 30 of first leg 20 adjacent to first end 22 of the first leg. Second leg 60 further includes a second side edge 72 which is a bottom side edge when second leg 60 is in use. Second side edge 72 is planar and is co-planar with second side edge 32 of first leg 20.

Second leg 60 further includes a first transverse axis 80 which is located adjacent to first end 62 of the second leg and which extends between first side edge 70 and second side edge 72 of the second leg. Second leg 60 further includes a second transverse axis 82 which is located adjacent to second end 64 of the second leg and which extends between first side edge 70 and second side edge 72 of the second leg. Second transverse axis 82 is essentially equal in length to first transverse axis 80 of the second leg and is also essentially equal in length to first transverse axis 34 of first leg 20. Second leg 60 further includes a third transverse axis 90 which is located between first end 62 and second end 64 of the second leg and which extends between first side edge 70 and second side edge 72 of the second leg. Third transverse axis 90 of the second leg is smaller in length than first transverse axis 80 of the second leg.

An indentation 94 is defined in first side edge 70 of the second leg. Indentation 94 is located between first end 62 and second end 64 of the second leg. Second side edge 72 of the second leg is planar and is co-planar with second edge 32 of the first leg.

Second leg 60 further includes a fourth transverse axis 100 located immediately adjacent to first end 62 of the second leg and which is located between first transverse axis 80 of the second leg and first end 62 of the second leg. Fourth transverse axis 100 is larger than first transverse axis 80. A retention foot 102 is located on first end 62 of the second leg.

A first hinge 110 connects first end 22 of the first leg to second end 64 of the second leg. The second leg is hingeably movable with respect to the first leg to move between a use orientation (shown in FIG. 1) which extends perpendicular to the first leg and a storage orientation which extends essentially parallel to the first leg.

A third leg 120 includes a first end 122, a second end 124 and a longitudinal axis 126 which extends between first end 122 and second end 124 of the third leg. Third leg 120 further includes a first side edge 130 which is a top side edge when the third leg is in use as shown in FIG. 1. First side edge 130 of the third leg adjacent to second end 124 of the third leg is co-planar with first side edge 30 of the first leg adjacent to second end 24 of the first leg. Third leg 120 further includes a second side edge 132 which is a bottom side edge when the third leg is in use. A first transverse axis 136 is located adjacent to first end 122 of the third leg and extends between first side edge 130 and second side edge 132 of the third leg.

A second transverse axis 138 is located adjacent to second end 124 of the third leg and extends between first side edge 130 and second side edge 132 of the third leg. Second transverse axis 138 is essentially equal in length to first transverse axis 136 of the third leg and is also essentially equal in length to the second transverse axis 36 of the first leg so that first side edge 30 of the first leg adjacent to second end 24 of the first leg is co-planar with first side edge 130 of the third leg adjacent to second end 124 of the third leg.

Third leg 120 further includes a third transverse axis 140 located between first end 122 and second end 124 of the third leg and extends between first side edge 130 and second side edge 132 of the third leg. Third transverse axis 140 of the third leg is smaller in length than first transverse axis 136 of the third leg. An indentation 142 is defined in first side edge 130 of the third leg. Indentation 142 is located between first end 122 and second end 124 of the third leg. Second side edge 132 of the third leg is planar and is co-planar with second edge 32 of the first leg.

A fourth transverse axis 150 is located immediately adjacent to first end 122 of the third leg and is located between first transverse axis 136 of the third leg and first end 122 of the third leg. Fourth transverse axis 150 is larger than first transverse axis 136 of the third leg, and a retention foot 152 is located on first end 122 of the third leg. A second hinge 160 connects second end 24 of first leg 20 to second end 124 of third leg 120. The third leg is hingeably movable with respect to the first leg to move between a use orientation, shown in FIG. 1, which extends perpendicular to the first leg and a storage orientation which extends essentially parallel to the first leg. Hinge 160 is sized relative to hinge 110 so that the second and third legs fold neatly onto each other and onto first leg 20 when the stand is in a stored configuration.

The first, second and third legs form a U-shape with the first side edge of the second leg adjacent to the second end of the second leg co-planar with the first side edge of the first leg adjacent to the first end of the first leg and the first side edge of the third leg adjacent to the second end of the third leg co-planar with the first side edge of the first leg adjacent to the second end of the first leg when the second and third legs are in the use orientations thereof with respect the first leg.

The indentations in the first, second and third legs defining air gaps between a laptop computer and the legs when the laptop computer is supported on the legs and the retention feet on the second and third legs abutting an edge of the laptop computer to support the laptop computer in place on the legs.

While various embodiments of the invention have been described, it will be apparent to those of ordinary skill in the art that many more embodiments and implementations are possible within the scope of this invention. Accordingly, the invention is not to be restricted except in light of the attached claims and their equivalents.

What is claimed is:

1. A laptop computer support stand comprising:
   A) a first leg which includes
      (1) a first end,
      (2) a second end,
      (3) a longitudinal axis which extends between the first end of the first leg and the second end of the first leg,
      (4) a first side edge which is a top side edge when the first leg is in use,
      (5) a second side edge which is a bottom side edge when the first leg is in use,
      (6) a first transverse axis which is located adjacent to the first end of the first leg and which extends between the first side edge of the first leg and the second side edge of the first leg,
      (7) a second transverse axis which is located adjacent to the second end of the first leg and which extends between the first side edge of the first leg and the second side edge of the first leg, the second transverse axis of the first leg being essentially equal in length to the first transverse axis of the first leg,
      (8) a third transverse axis which is located between the first end of the first leg and the second end of the first leg and which extends between the first side edge of the first leg and the second side edge of the first leg, the third transverse axis of the first leg being smaller in length than the first transverse axis of the first leg,
      (9) an indentation in the first side edge of the first leg, the indentation in the first side edge of the first leg being located between the first end of the first leg and the second end of the first leg, and
      (10) the second side edge of the first leg being planar;
   B) a second leg which includes
      (1) a first end,
      (2) a second end,
      (3) a longitudinal axis which extends between the first end of the second leg and the second end of the second leg,
      (4) a first side edge which is a top side edge when the second leg is in use, the first side edge of the second leg adjacent to the second end of the second leg being co-planar with the first side edge of the first leg adjacent to the first end of the first leg,
      (5) a second side edge which is a bottom side edge when the second leg is in use,
      (6) a first transverse axis which is located adjacent to the first end of the second leg and which extends between the first side edge of the second leg and the second side edge of the second leg,
      (7) a second transverse axis which is located adjacent to the second end of the second leg and which extends between the first side edge of the second leg and the second side edge of the second leg, the second transverse axis of the second leg being essentially equal in length to the first transverse axis of the second leg and being essentially equal in length to the first transverse axis of the first leg,
- (8) a third transverse axis which is located between the first end of the second leg and the second end of the second leg and which extends between the first side edge of the second leg and the second side edge of the second leg, the third transverse axis of the second leg being smaller in length than the first transverse axis of the second leg,
- (9) an indentation in the first side edge of the second leg, the indentation in the first side edge of the second leg being located between the first end of the second leg and the second end of the second leg,
- (10) the second side edge of the second leg being planar and being co-planar with the second edge of the first leg,
- (11) a fourth transverse axis which is located immediately adjacent to the first end of the second leg and which is located between the first transverse axis of the second leg and the first end of the second leg, the fourth transverse axis of the second leg being larger than the first transverse axis of the second leg, and
- (12) a retention foot on the first end of the second leg;

C) a first hinge connecting the first end of the first leg to the second end of the second leg;
D) the second leg being hingeably movable with respect to the first leg to move between a use orientation which extends perpendicular to the first leg and a storage orientation which extends essentially parallel to the first leg;
E) a third leg which includes
- (1) a first end,
- (2) a second end,
- (3) a longitudinal axis which extends between the first end of the third leg and the second end of the third leg,
- (4) a first side edge which is a top side edge when the third leg is in use, the first side edge of the third leg adjacent to the second end of the third leg being co-planar with the first side edge of the first leg adjacent to the second end of the first leg,
- (5) a second side edge which is a bottom side edge when the third leg is in use,
- (6) a first transverse axis which is located adjacent to the first end of the third leg and which extends between the first side edge of the third leg and the second side edge of the third leg,
- (7) a second transverse axis which is located adjacent to the second end of the third leg and which extends between the first side edge of the third leg and the second side edge of the third leg, the second transverse axis of the third leg being essentially equal in length to the first transverse axis of the third leg and being essentially equal in length to the second transverse axis of the first leg,
- (8) a third transverse axis which is located between the first end of the third leg and the second end of the third leg and which extends between the first side edge of the third leg and the second side edge of the third leg, the third transverse axis of the third leg being smaller in length than the first transverse axis of the third leg,
- (9) an indentation in the first side edge of the third leg, the indentation in the first side edge of the third leg being located between the first end of the third leg and the second end of the third leg,
- (10) the second side edge of the third leg being planar and being co-planar with the second edge of the first leg,
- (11) a fourth transverse axis which is located immediately adjacent to the first end of the third leg and which is located between the first transverse axis of the third leg and the first end of the third leg, the fourth transverse axis of the third leg being larger than the first transverse axis of the third leg, and
- (12) a retention foot on the first end of the third leg;

F) a second hinge connecting the second end of the first leg to the second end of the third leg;
G) the third leg being hingeably movable with respect to the first leg to move between a use orientation which extends perpendicular to the first leg and a storage orientation which extends essentially parallel to the first leg;
H) the first, second and third legs forming a U-shape with the first side edge of the second leg adjacent to the second end of the second leg being co-planar with the first side edge of the first leg adjacent to the first end of the first leg and the first side edge of the third leg adjacent to the second end of the third leg being co-planar with the first side edge of the first leg adjacent to the second end of the first leg when the second and third legs are in the use orientations thereof with respect to the first leg; and
I) the indentations in the first, second and third legs defining air gaps between a laptop computer and the legs when the laptop computer is supported on the legs and the retention feet on the second and third legs abutting an edge of the laptop computer to support the laptop computer in place on the legs.

2. A laptop computer support stand comprising:
A) a first leg having an indentation in one side edge thereof;
B) a second leg having an indentation in one side edge thereof and a retention lip on a first end thereof;
C) a first hinge connecting the first leg to the second leg so the second leg is movable between a first orientation with respect to the first leg extending perpendicular to the first leg and a second orientation with respect to the first leg extending essentially parallel to the first leg;
D) a third leg having an indentation in one side edge thereof and a retention lip on a first end thereof;
E) a second hinge connecting the first leg to the third leg so the third leg is movable between a first orientation with respect to the first leg extending perpendicular to the first leg and a second orientation with respect to the first leg extending essentially parallel to the first leg;
F) the first, second and third legs forming a U-shape when the second and third legs are in the second orientations thereof with respect to the first leg;
G) the indentations in the first, second and third legs defining air gaps between a laptop computer and the legs when the laptop computer is supported on the legs and the retention lips on the second and third legs abutting an edge of the laptop computer to support the laptop computer in place on the legs.

\* \* \* \* \*